United States Patent Office 3,290,409
Patented Dec. 6, 1966

3,290,409
PREPARATION OF POLYCARBONATE RESINS
Howard E. Munro, Pittsfield, Mass., assignor to General Electric Company, a corporation of New York
No Drawing. Filed Mar. 8, 1962, Ser. No. 178,254
8 Claims. (Cl. 260—860)

This invention relates to the preparation of linear aromatic carbonate polymers and more particularly is concerned with a novel and an economical process for preparing a polymerization reaction mixture from which a particularly pure carbonate polymer may be recovered efficiently.

The known methods for preparing aromatic carbonate polymers which involve the reatction of phosgene with a dihydric phenol or a salt of a dihydric phenol fall into two categories: solution polymerization and emulsion polymerization. Generally speaking, solution polymerization involves the phosgenation of a solvent solution of a dihydric phenol in the presence of an organic base, whereas emulsion polymerization techniques call for the phosgenation of an emulsion prepared by admixing an aqueous solution of a dihydric phenol salt, an inorganic base, and an organic solvent capable of dissolving phosgene and eventually the produced polymer.

Although the foregoing methods have provided satisfactory carbonate polymers, they are economically unattractive at multi-million pounds per year levels of operation. For instance, solution polymerization methods for preparing high molecular weight aromatic carbonate polymers require the use of expensive organic bases as acid acceptors during the polymerization reaction. The problems of solvent separation and recovery as well as polymer purification serve further to handicap solution techniques. The use of pyridine in solution methods is illustrative in this regard. Pyridine has been favored in the past since it simultaneously acts as an acid acceptor and as a solvent during the polymerization reaction. In order to justify the use of pyridine, 98% or more of the pyridine employed in the reaction must be recovered. Pyridine recovery is achieved only with difficulty, however, and requires the use of expensive separation equipment. Moreover, the phosgenated pyridine solution containing the carbonate polymer has a high concentration of pyridine hydrochloride which invariably contaminates the polymer. Thus, the polymer recovered from the pyridine solution must be purified in orded to render it commercially suitable. Although other less expensive solvents have been used or suggested for use in combination with, or in lieu of, pyridine, in an effort to reduce costs, their use has not simplified the problems of solvent recovery and polymer purification.

The phosgenation of a solvent solution of a dihydric phenol or of a dihydric alcohol in the presence of relatively inexpensive inorganic acid acceptors has also been suggested, as for example, in U.S. Patent 2,999,844. The method therein described, however, is directed primarily to the preparation of aliphatic carbonate polymers of relatively low molecular weight, i.e., of the order of 1,000, whereas the method of the present invention enables the preparation of very much higher molecular weight aromatic carbonate polymers. Using the present method, polymers having a molecular weight of the order of 100,000 and higher have been prepared. Further, the specific method described by the patentees requires the use of certain conditions differing from and contrary to the inventive concept of the present method. For example, while in the present method the polymerization reaction occurs in organic liquids which are non-solvents for the dihydric phenols employed, the patentees utilize organic liquids in which dihydric compounds are soluble. Moreover, the solvents employed by the patentees are non-solvents for high molecular weight aromatic carbonate polymers produced by the method of the present invention, a factor which is critical in the successful recovery of such polymers.

Emulsion polymerization techniques for the preparation of carbonate polymers are handicapped by virtue of the fact that the phosgenated reaction mixtures obtained by emulsion methods contain two immiscible liquid phases, i.e., an aqueous phase and an organic phase consisting of a solvent solution of the carbonate polymer. Accordingly, a separation of these two liquid phases must be effected before the polymer may be recovered. Although such a separation may not have been considered a significant problem in the past, it has become particularly acute where great quantities of polymer are prepared. Furthermore, the organic phase, i.e., solvent solution of carbonate polymer, which is present in the phosgenated emulsion contains significant quantities of emulsified water droplets which contain a high concentration of contaminates. As in solution techniques, therefore, polymers obtained by emulsion methods require purification before a separation of the polymer from solution has been effected.

It is, therefore, a primary object of the present invention to provide a simplified and an economical process for the preparation of high molecular weight linear aromatic carbonate polymers.

A more specific object of this invention is to provide a simplified process for preparing a polymerization reaction mixture from which a particularly pure carbonate polymer may be recovered efficiently.

Generally speaking, the process of the present invention comprises passing a carbonyl halide into a slurry comprising a suspension of solid particles in a single liquid phase, the suspension of solid particles comprising a dihydric phenol and at least 2 moles, per mole of dihydric phenol, of at least one acid acceptor selected from the group consisting of a hydroxide, a carbonate, a bicarbonate and a phosphate of an alkali or an alkaline earth metal, and the single liquid phase comprising an inert organic liquid which is a solvent for the carbonate polymer, but a non-solvent for the dihydric phenol and the acid acceptor, to form a reaction mixture having a solid phase and a single liquid phase comprising a solution of the carbonate polymer in the inert organic liquid, and separating the liquid phase from the solid phase.

In carrying out the polymerization reaction it is within the scope of the invention to use two or more different dihydric phenols if a copolymer rather than a homopolymer is desired. Polymerization catalysts may also be added if desired. Suitable catalysts are tertiary amines such as, for example, triethyl amine; tripropyl amine; N,N dimethyl aniline; quaternary ammonium compounds, such as, for example, tetraethylammonium bromide; cetyl triethylammonium bromide; tetra-n-heptyl-ammonium iodide; tetra-n-propylammonium bromide; tetramethylammonium chloride; tetramethylammonium hydroxide; tetra-n-butylammonium iodide; benzyl trimethylammonium chloride; and quaternary phosphonium compounds, such as, for example, n-butyl triphenyl phosphonium bromide, and methyl triphenyl phosphonium bromide. The amount of catalyst used may range from none up to about 4% based upon the moles of dihydric phenol initially charged to the slurry.

Also, molecular weight regulators may be added, as for example, monofunctional phenols, i.e., phenol, p-tertiary butyl phenol; monofunctional organic acids, i.e., benzoic acid, acetic acid; and monofunctional alcohols, i.e., methanol, ethanol; in amounts of up to 2 percent based upon the weight of the dihydric phenol originally charged to the reaction mixture.

The reaction time may vary from a few minutes to a few hours, depending upon the particular polymer prepared, the degree of polymerization desired and the choice of other reaction conditions. The temperatures at which the reaction may be consummated may also vary widely, although room temperatures (25° C.) to 100° C., and particularly the reflux temperatures, at atmospheric pressure, of the inert organic liquids used in the reaction, have been found to be convenient.

The term "an inert organic liquid which is a non-solvent for a dihydric phenol and the acid acceptor, but a solvent for the carbonate polymer" as used herein is meant to embrace within its scope only those organic liquids which:

(a) are inert in the sense that they do not enter into the polymerization reaction;

(b) are incapable of dissolving the inorganic acid acceptors employed;

(c) are stable to hydrolysis in the presence of such inorganic acid acceptors;

(d) are incapable of dissolving at the reaction temperatures dihydric phenols such as 2,2-bis-(4-hydroxyphenyl)-propane in amounts greater than 2% by weight;

(e) have the capacity to dissolve at the reaction temperatures in amounts greater than 5% by weight high molecular weight carbonate polymers, such as a polymer obtained by condensing phosgene with 2,2-bis-(4-hydroxyphenyl)-propane and having an intrinsic viscosity of 0.6 (intrinsic viscosity as used herein is measured in deciliters per gram in p-dioxane at 30° C.). Examples of organic liquids which fall within the scope of this term and which are preferred in the practice of the invention are methylene chloride, 1,2-dichloroethane, and chlorobenzene.

The amount of inert organic liquid used in the polymerization process is not critical. It is only necessary that a sufficient amount of inert organic liquid be used to dissolve all of the carbonate polymer present at the conclusion of the reaction so as to permit an easy separation of the desired polymer from the reaction mixture. Ordinarily, sufficient inert organic liquid is used to provide a 5–20% solution of the polymer in the inert organic liquid, or from about 5 to about 20 times, by weight, as much inert organic liquid as dihydric phenol originally charged to the reaction mixture. In the event the polymer solution obtained is too viscous to be easily separated from the solid inorganic phase, it is, of course, possible to add more organic liquid to the reaction mixture to facilitate such separation.

The quantity of inorganic acid acceptor used in the polymerization reaction may vary from about 2 moles to about 8 moles per mole of dihydric phenol originally charged to the reaction mixture, depending upon the specific inorganic material used, the degree of polymerization desired, and the amount, if any, of polymerization catalyst added. Generally speaking, the use of calcium hydroxide is preferred due principally to its availability and low cost, although other hydroxides, carbonates, bicarbonates or phosphates of alkali or alkaline earth metals may be used. As will be appreciated by those skilled in the art, it is possible to employ a mixture of two or more of such inorganic acid acceptors. In the event calcium hydroxide alone is employed, however, about 3.5 moles of the hydroxide per mole of dihydric phenol provides optimum results.

The molar quantity of carbonyl halide used should be substantially equal to or slightly greater than the molar quantity of dihydric phenol employed. A preferred upper range for the quantity of carbonyl halide is 115–120% of theory. Although larger excesses may be used, they are neither necessary nor economically desirable. Theoretically, one mole of the carbonyl halide reacts with one mole of the dihydric phenol to produce the polymer and two moles of the halo acid. The halo acid in turn forms an inorganic salt with the acid acceptor. The foregoing are herein referred to as stoichiometric or theoretical amounts.

After the polymerization reaction is completed, the single liquid phase comprising a solution of the synthesized carbonate polymer is separated from the inorganic solid phase which constitutes the remainder of the reaction mixture by any of the well known liquid-solid separation techniques, such as, for example, filtration or centrifugation followed by decantation. The solution of carbonate polymer thus obtained contains 90% or more of the theoretical amount of polymer prepared during the course of the reaction, and has a halide content of less than 25 parts per million measured as chloride ion. If desired, the filter cake from the filtration step, or solid layer after decanting may be repeatedly washed with inert organic polymer solvent of the type used in the polymerization reaction to separate and remove any remaining carbonate polymer. This wash solution may be combined with the polymer solution for a subsequent separation of the carbonate polymer.

Separation of the carbonate polymer from the solvent solution may be accomplished in a number of ways, as by precipitation by the addition of an aliphatic hydrocarbon non-solvent, such as pentane, hexane, heptane, and mixed petroleum spirits with boiling points sufficiently different from the polymer solvent to enable easy separation by distillation, or by the addition of aliphatic alcohol non-solvents such as methanol, ethanol, isopropanol or n-propanol, or by simply evaporating the polymer solution to dryness.

In order that those skilled in the art may better understand how the present invention may be practiced, the following examples are given by way of illustration and not by way of limitation. All parts and percentages are by weight unless otherwise noted.

EXAMPLE 1

A slurry was prepared by stirring the following materials in a reaction vessel:

114 parts 2,2 bis-(4-hydroxyphenyl)-propane
129.6 parts calcium hydroxide
760 parts methylene chloride The slurry was heated to about 40° C. at which time heating was discontinued. Phosgene was then added to the stirred slurry at a rate of about 0.82 part per minute for about 55 minutes and thereafter at 0.08 part per minute for an additional 90 minutes. The heat generated by the reaction maintained the slurry at a temperature of 38–40°, i.e., the reflux temperature of the methylene chloride. After the reaction had subsided, air was blown through the reaction mixture to cool it and free it of any excess phosgene. The cooled slurry was then diluted with methylene chloride, centrifuged, and the solid phase removed. The single liquid phase obtained, consisting of a solution of the carbonate polymer in the methylene chloride, was filtered, and the carbonate polymer precipitated by adding heptane to the solution. The polymer was separated from the mixture by filtration and dried at 125° C. The intrinsic viscosity measured in dioxane at 30° C. of the polymer was 0.54, which corresponds to a molecular weight of about 35,000 (weight average).

EXAMPLE 2

A slurry was prepared by stirring the following materials in a reaction vessel:

136.8 parts 2,2-bis-(4-hydroxyphenyl)-propane
133.2 parts calcium hydroxide
1.07 parts cetyl triethylammonium bromide
910 parts 1,2-dichloroethane The slurry was heated to 70° C. at which time the heating was discontinued. Phosgene was then added to the stirred slurry at a rate of 0.99 part per minute for 65 minutes. The heat generated by the reaction served to maintain the reaction mixture at about 70° C. during the entire period of phosgenation. The viscous slurry was then cooled and freed of any excess phosgene as in the previous example. Thereafter, the cooled slurry was diluted with 750 parts of 1,2-dichloroethane, centrifuged, and the single liquid phase removed. The clarified polymer solution was diluted with an additional 660 parts of 1,2-dichloroethane and subsequently filtered. The clear filtrate was then mixed with a double volume of heptane to precipitate the polymer product. The precipitated carbonate polymer was separated from the solvent mixture by filtration and dried at 125° C. The intrinsic viscosity measured in dioxane at 30° C. of the polymer thus obtained was 0.82, which corresponds to a molecular weight of about 63,000 (weight average).

EXAMPLE 3

A slurry was prepared by mixing together the following ingredients in a reaction vessel:

136.8 parts of 2,2-bis(4-hydroxyphenyl)-propane
133.2 parts calcium hydroxide
1.6 parts tetra n-heptylammonium iodide
912 parts 1,2-dichloroethane The slurry was heated to 70° and then phosgenated at a rate of one part per minute for 65 minutes. The viscous slurry was cooled by blowing air through it and subsequently diluted with 2,490 parts of 1,2-dichloroethane. The diluted slurry was then treated in the manner outlined in Example 2 to obtain the carbonate polymer. The reduced viscosity (at a concentration of 0.4 gram/deciliter measured in dioxane at 30° C.) of the polymer thus obtained was 2.035, which corresponds to a molecular weight of about 150,000 (weight average).

EXAMPLE 4

A slurry was prepared by mixing the following materials in a reaction vessel:

114 parts 2,2-bis-(4-hydroxyphenyl)-propane
111 parts calcium hydroxide
1.06 parts tetraethylammonium bromide
760 parts 1,2-dichloroethane The slurry was heated, with stirring, to a temperature of 73° C. at which point heating was discontinued. Phosgene was then bubbled into the stirred slurry at a rate of 0.83 part per minute for 50 minutes, at which point the rate of addition was reduced to 0.28 part per minute and continued for 35 minutes. The viscous slurry was then cooled and freed of any excess phosgene by blowing a stream of air through it. Thereafter, the cooled slurry was diluted with 500 parts of 1,2-dichloroethane, centrifuged, and filtered to remove the solid phase. The clear filtrate was mixed with a double volume of heptane to precipitate the polymer. The separated polymer, after being dried at 125° C., was found to have an intrinsic viscosity of 0.55, which corresponds to a molecular weight of 35,000 (weight average).

EXAMPLE 5

A slurry was prepared by stirring together the following materials in a reaction vessel:

114 parts 2,2-bis-(4-hydroxyphenyl)-propane
55.5 parts calcium hydroxide
60 parts sodium hydroxide
0.63 part tetraethylammonium bromide
760 parts of methylene chloride The slurry was heated to 40° C. and thereafter phosgenated at a rate of 0.83 part per minute for 65 minutes. The viscous slurry was cooled and freed of excess phosgene by blowing a stream of air through it, diluted with 665 parts of methylene chloride, centrifuged, and filtered to remove the solid phase. The clear filtrate was mixed with a double volume of heptane to precipitate the carbonate polymer. After the precipitated polymer was removed by filtration, it was dried at 125° C. The polymer thus obtained had a reduced viscosity (in p-dioxane at 30° C. and 0.4 gram/deciliter) of 2.03, corresponding to a molecular weight of about 150,000 (weight average).

EXAMPLE 6

Example 5 was repeated with the substitution of 111 parts of calcium hydroxide and 6.8 parts of potassium hydroxide for the calcium hydroxide-sodium-hydroxide combination used in that example. The resulting polymer obtained was found to have an intrinsic viscosity of 0.51, corresponding to a molecular weight of about 31,000 (weight average).

EXAMPLE 7

A slurry was prepared by mixing the following materials in a reaction vessel:

91.2 parts 2,2-bis-(4-hydroxyphenyl)-propane
16.6 parts isophthalic acid
103.7 parts calcium hydroxide
4.2 parts sodium hydroxide
1.06 parts tetraethylammonium bromide
622 parts 1,2-dichloroethane The slurry was heated to 70° C. and then phosgenated at a rate of 0.82 part per minute for 65 minutes. Thereafter the slurry was cooled, diluted with 376 parts of 1,2-dichloroethane, and centrifuged and filtered to remove the solid phase. The carbonate copolymer precipitated from solution with a double volume of heptane. The separated product was dried at 125° C. The intrinsic viscosity of the copolymer thus obtained was 0.41, corresponding to a molecular weight of about 23,000 (weight average). Infrared analysis indicated the presence of both carbonate and carboxylate linkages in the copolymer chain.

EXAMPLE 8

A slurry was prepared by stirring the following materials in a reaction vessel:

27 parts of 2,2-bis-(4-hydroxyphenyl)-propane
184 parts methylene chloride
27.25 parts calcium hydroxide
0.248 part tetraethylammonium bromide
0.153 part phenol 11.75 parts phosgene were added to this slurry over a 70-minute period. After phosgenation was completed, the slurry was stirred for an additional 20 minutes and then diluted by adding 154 parts of methylene chloride. The solid phase was separated from the resin solution by centrifugation. The liquid phase was filtered through a cartridge filter to remove all solid particles having diameters greater than ½ micron. The filtrate thus obtained was found to contain 25 parts per million of ionic chloride. This filtrate was then mixed with a double volume of heptane in an agitated vessel to precipitate the polycarbonate resin. A separation of the solid resin particles from the methylene chloride-heptane liquid mixture was effected, and the solid resin particles heated to 120° C. and maintained at that temperature for 18 hours in an air circulating oven. The dried resin was then extruded in a John Royles extruder at about 500° F. The extrudate was chopped into pellets which were found to contain 8 parts per million of ionic chloride. These pellets had an intrinsic viscosity of 0.56 (measured in p-dioxane at 30° C.) which corresponds to a molecular weight of about 35,000 (weight average) and a melt viscosity of 3250 poises after 30 minutes at 600° F.

The polycarbonate resin thus obtained was molded on a 2 oz. Van Dorn injection molding machine at a cylinder and nozzle temperature of 600° F. into test bars measuring 2½" by ½" by 140 mils thick. These bars were found to have an intrinsic viscosity of 0.53. The bars were then notched and the notched Izod impact strength determined according to ASTM Test D-256. An average value of 17.2 ft. lbs./in. of notch was determined with 100% of the bars giving ductile breaks.

EXAMPLE 9

A slurry was prepared by stirring the following materials in a reaction vessel:

45.6 parts of 2,2-bis-(4-hydroxyphenyl)-propane
55 parts of hydroxyl terminated neopentylglycoladipate of reduced viscosity 0.15 measured in chloroform at 30° C. and 0.4 gram/deciliter
96 parts of calcium chloride
24 parts of sodium hydroxide
2 parts of tetraethylammonium bromide
512 parts methylene chloride The resulting slurry was phosgenated by adding 0.8 part of phosgene per minute over a 67-minute period. Upon completion of phosgenation, the reaction mixture was centrifuged and filtered to yield a clear liquid phase containing the polycarbonate product, and a solid inorganic phase which was discarded. The carbonate copolymer was recovered by heating the clear solution to vaporize the methylene chloride. The resulting residue was a tough, light colored, elastomeric material having a reduced viscosity of 0.607 (measured at 30° C. in p-dioxane at 0.4 gram/deciliter) which corresponds to a molecular weight of about 35,000 (weight average).

EXAMPLE 10

A slurry was prepared by mixing the following materials in a reaction vessel:

114 parts 2,2-bis-(4-hydroxyphenyl)-propane
760 parts methylene chloride
129.5 parts calcium hydroxide
0.076 part N,N-dimethylaniline The slurry was heated to 38° C., phosgenated at a rate of 0.82 part per minute for 60 minutes and then at a rate of 0.28 part per minute for 15 minutes. The cooled reaction mixture was centrifuged and filtered to remove the solid phase. The clear filtrate was mixed with a double volume of heptane to precipitate the carbonate polymer. The precipitated polymer was then removed from the mixture by filtration, and subsequently dried at 125° C. The resulting polymer product and an intrinsic viscosity of 0.75, which corresponds to a molecular weight of about 55,000 (weight average).

EXAMPLE 11

A slurry was prepared by mixing the following materials in a reaction vessel:

114 parts of 2,2-bis-(4-hydroxyphenyl)-propane
111 parts of calcium hydroxide
760 parts ethylene chloride
0.599 part n-butyl triphenylphosphonium bromide The slurry was heated to 71° C. and then phosgenated at a rate of 0.82 part per minute for 65 minutes. The reaction mixture was treated in the same manner as Example 1. The carbonate polymer thus obtained was found to have an intrinsic viscosity of 0.66, which corresponds to a molecular weight of about 46,000 (weight average).

The linear carbonate polymers which may be prepared by the process of the present invention may be typified as processing repeating structural units of the formula

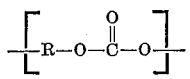

where R is a divalent organic radical of the dihydric phenol employed in the polymer producing reaction. The dihydric phenols which may be used in accordance with the invention are mononuclear or polynuclear aromatic compounds containing, as functional groups, two hydroxyl radicals, each of which is attached directly to a carbon atom of an aromatic nucleus. Typical dihydric phenols are hydroquinone; resorcinol; 2,2-bis-(4-hydroxyphenyl)-propane; 2,2-bis-(3-methyl-4-hydroxyphenyl) propane; and p,p'-dihydroxydiphenyl ether. A variety of additional dihydric phenols which may be used in the practice of the present invention are disclosed in U.S. Patent 2,999,835—Goldberg, assigned to the assignee of the present invention. It is, of course, possible to employ two or more different dihydric phenols or a dihydric phenol in combination with a glycol or a hydroxy terminated polyester or a dibasic acid in the event a carbonate copolymer rather than homopolymer is desired.

One of the significant advantages of the present invention is that the reaction mixture at the termination of the polymerization reaction contains only one liquid phase, i.e., the organic solvent solution of the desired polymer, which solution may relatively easily be separated, as for example, by filtration or by centrifugation, from the inorganic solid phase of the reaction mixture. The fact that only a single liquid phase exists at the termination of the reaction is totally unexpected and is not fully understood since water is formed during the course of the reaction and would be expected to be present as a separate phase. Since no aqueous phase is present in a reaction mixture prepared in accordance with the method of the present invention, the difficult problem of completely separating two liquid phases before polymer recovery may be achieved is entirely obviated.

Another important advantage of the present invention is that the carbonate polymer solution which constitutes the single liquid phase of the reaction mixture prepared by the process of the invention is relatively free of ionic contamination, i.e., has an ionic contamination of less than 25 parts per million expressed as chloride ion. Accordingly, carbonate polymers prepared by the present process do not require subsequent purification. Furthermore, the organic liquid from which the polymer is recovered is itself sufficiently pure so as not to necessitate further treatment before being used in subsequent polymerization reactions.

Still another major advantage of the present invention is that the relatively inexpensive acid acceptors used in the present process may be disposed of after a single use, thus eliminating the necessity for their purification and recovery.

The high molecular weight aromatic carbonate polymers prepared by the process of the present invention have untility in the manufacture of films, fibers, molded or extruded parts, and in the preparation of surface coatings for use in structural, decorative, and electrical applications.

What I claim as new and desire to secure by Letters Patent of the United States is:

1. The process for preparing a carbonate polymer which process comprises passing a carbonyl halide through a slurry comprising a suspension of solid particles in a single liquid phase,
    the suspension of solid particles comprising
        (1) a dihydric phenol and
        (2) at least 2 moles, per mole of dihydric phenol, of at least one acid acceptor selected from the group consisting of alkali and alkaline earth metal hydroxides, carbonates and bicarbonates,
    and the single liquid phase comprising an inert organic liquid which is a solvent for the carbonate polymer but a non-solvent for the dihydric phenol and the acid acceptor,
    to form a reaction mixture having
        a solid phase, and
        a single liquid phase comprising a solution of the carbonate polymer in said inert organic liquid,
    and separating the solid phase from the liquid phase.

2. The process of claim 1 in which the inert liquid is methylene chloride.

3. The process of claim 1 in which the inert liquid is 1,2 dichloroethane.

4. The process of claim 1 in which the carbonyl halide is phosgene.

5. The process of claim 1 in which the dihydric phenol is 2,2-bis-(4-hydroxyphenyl)-propane.

6. The process of claim 1 in which the acid acceptor is calcium hydroxide.

7. The process of claim 1 in which the separation of the two phases of the reacting mixture is effected by centrifugation.

8. The process of claim 1 in which the slurry includes a hydroxyl terminated polyester of a dibasic acid and a glycol.

References Cited by the Examiner
UNITED STATES PATENTS

| | | | |
|---|---|---|---|
| 2,964,794 | 12/1960 | Peilstöcker et al. | 260—47 X |
| 2,997,459 | 8/1961 | Schnell et al. | 260—47 X |
| 2,999,844 | 9/1961 | Müller | 260—47 X |
| 3,112,292 | 11/1963 | Bottenbruch et al. | 260—47 |

WILLIAM H. SHORT, *Primary Examiner.*

LOUISE P. QUAST, *Examiner.*